Patented Apr. 19, 1932

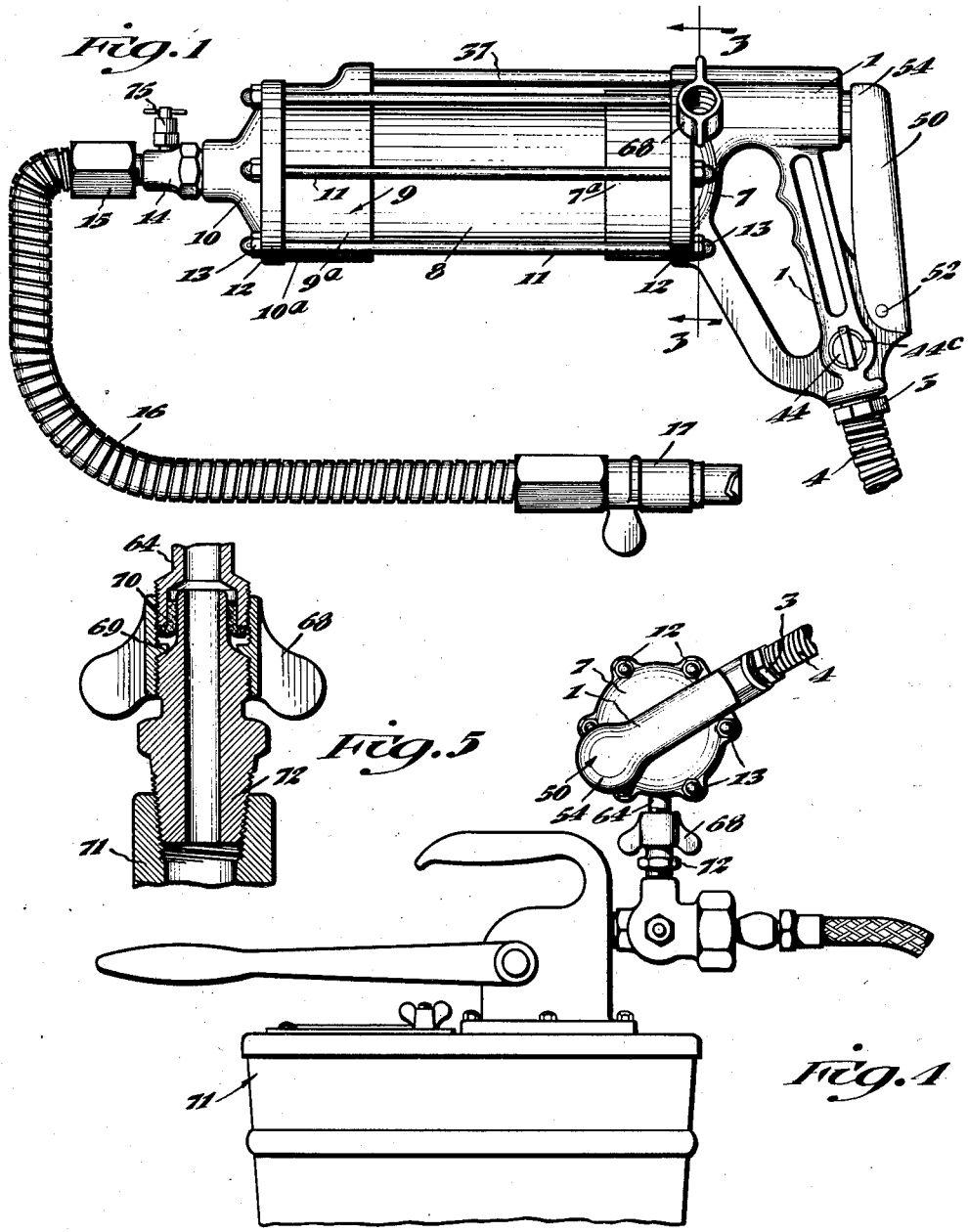

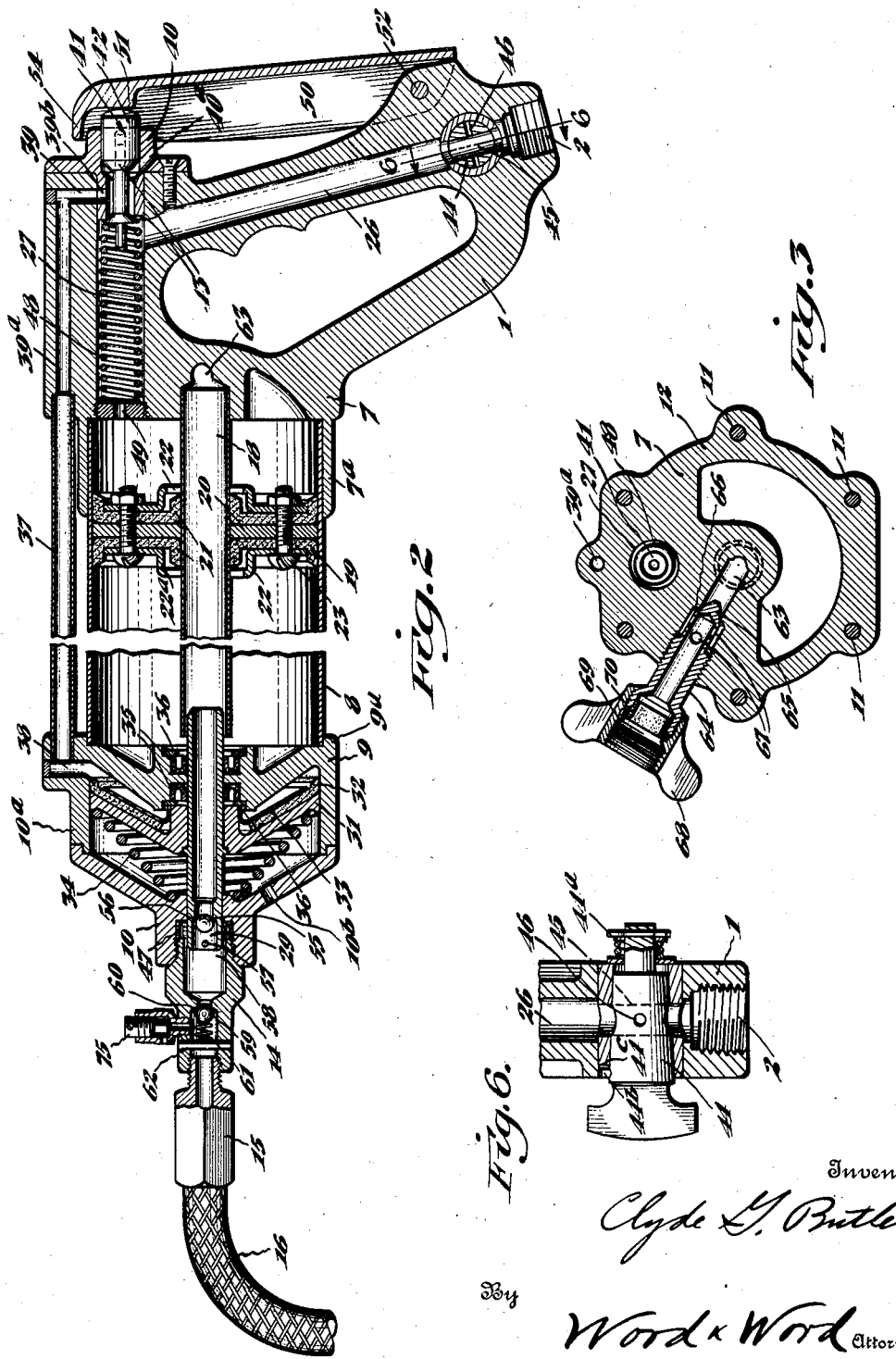

1,854,688

UNITED STATES PATENT OFFICE

CLYDE G. BUTLER, OF CINCINNATI, OHIO, ASSIGNOR TO THE CINCINNATI BALL CRANK COMPANY, OF CINCINNATI, OHIO, A CORPORATION OF OHIO

LUBRICATING APPARATUS

Application filed December 21, 1928. Serial No. 327,677.

This invention relates to lubricating apparatus and particularly to an instrumentality adapted to discharge lubricant such as heavy grease under high pressure in the range of from six to eight thousand pounds per square inch. The instrumentality is adapted to be operated by compressed air supplied to it by a flexible conduit, and to discharge the grease through a second flexible conduit having upon its end a coupling member adapted to discharge grease into fittings conventionally disposed at the bearings to be lubricated, or at other points where lubrication is desired.

The object of the invention is to provide a very light and readily portable pneumatically operated lubricator of the nature disclosed adapted to hold, for instance, one pound of lubricant, to discharge the same under the desired high pressure, to be easily operated by the depressing and releasing of a single trigger only, and also adapted to be readily refilled with grease.

Another object of my invention is to provide a heavy-duty lubricator combining a grease reservoir provided with an air actuated follower piston for uniformly compacting the grease toward the outlet, a superpressure grease discharge chamber containing the grease under the compacting force of the follower piston, and an air chamber for actuating the instrumentality which acts upon the grease to impact it through the outlet of the discharge chamber in a series of shocks or charges.

The ejector instrumentality comprises a hollow tube constituting a grease conduit, the opposite ends of which are operatively placed in the one end of the reservoir to take in a charge of grease, and the other end acting as a plug in the discharge chamber to eject a charge of grease, this ejector piston being provided with a large area member preferably having the same diameter as the follower piston and the reservoir, which is acted upon by the air pressure in the air cylinder to force the grease through the outlet, and being returned by a spring in the air chamber. By means of these instrumentalities so constructed and arranged, I am able to constitute of the discharge chamber, a superpressure chamber because the air line pressure, say two hundred pounds, which acts constantly upon the follower piston, is introduced in front of the ejector piston in the air chamber, and the pressure will be increased at the outlet to a degree corresponding to the ratios between the area of the ejector piston surface and the area of the small or plug end of the ejector in the discharge chamber.

This functions to build up an immense pressure and produce a small, compact, unitary and efficient heavy-duty gun dispensing with manual labor and constituting virtually a small power plant. Of course, it is necessary in such a combination to provide means, such as a valve for controlling the outlet, to prevent leakage in relation to the constant air pressure on the follower piston, and also to provide something in the nature of a floating valve for the ejector conduit to insure the unidirectional flow of the grease, and to make the conduit act as a loading instrumentality in the reservoir and an ejector instrumentality in the discharge chamber.

Further objects and advantages will be more fully set forth in a description of the accompanying drawings, forming a part of this specification, in which:

Figure 1 is a side elevation of the pneumatically operated lubricator of the present invention, showing the discharge conduit attached thereto and the coupling member on the end of the discharge conduit for suitable attachment to the fittings to be charged.

Figure 2 is a sectional view taken longitudinally and centrally of the improved lubricator.

Figure 3 is a sectional view taken on line 3—3, Figure 1, showing the connection for attaching the lubricator to a reservoir such as a large grease bucket, the connection being made to a valve of the lubricator for controlling the filling opening.

Figure 4 is a fragmentary view of the upper end of a supply reservoir such as a grease bucket, showing the lubricator of the present invention in connection therewith for a refilling of the lubricator.

Figure 5 is a sectional view taken through the nipple or fitting of the supply container, and showing the manner in which the valve in the filling passageway of the present invention is connected thereto.

Figure 6 is a sectional view taken on line 6—6, Figure 2, illustrating the valve in the main air intake passageway.

Referring to the drawings, a lubricant reservoir or low pressure chamber is shown as formed by a cylinder 8 having cylinder heads 7 and 9 drawn upon its respective ends. Each of the cylinder heads has a cup flange, respectively 7a and 9a, provided for receiving the respective ends of the cylinder. The heads are held together on the cylinder by means of a plurality of draw bolts 11 disposed concentrically around and longitudinally of the cylinder. As shown in Figure 1, these draw rods extend through flanges 12—12 on the respective cylinder heads and are drawn therebetween by means of nuts 13.

The cylinder head 9 is made sectional, the outer section 10 thereof, having the flange 12 thereon, and providing an overhanging flange for a socket engagement with the cup-shaped outer wall of the inner head section 10a. The assembled sections 10 and 10a provide an air chamber for the purpose of actuating a tubular ejector plunger 29 slidably mounted in the respective walls of the sections 10 and 10a.

By the arrangement of the ejector plunger it is provided that the rear end thereof extends into the reservoir or low pressure chamber, and the forward end thereof extends into a high pressure chamber constituted by a hollow sleeve 14 screwed into the wall of the section 10. By this arrangement of parts, the high pressure chamber, the tubular ejector plunger, the air cylinder, and the low pressure reservoir are all concentrically disposed. The reservoir chamber and the air cylinders are of the same diameter.

A pneumatically actuated piston 31 is rigidly secured to the tubular ejector plunger 29 and slidably disposed within the bore of the air cylinder.

A charging tube 18 is secured concentrically within the reservoir or low pressure chamber, being fixed into the head 7 and there in communication with a loading or charging intake passageway 63 extending radially through the head. A follower piston 19 is slidably mounted within the reservoir, being in engagement with the walls of the cylinder 8 and about the tube 18. The unattached end of the tube 18 stops short of the cylinder head 9 and the charging end of the ejector plunger 29 extends thereinto.

A means for supplying a constant line pressure to the follower piston 19 and an intermittent air pressure to the high pressure pneumatically operated piston 31 is provided of the following nature: The cylinder head 7 is provided with a grip extension 1. A passageway 26 extends from the butt end of the grip through the handle portion to the upper confines thereof. The opening of the passageway 26 is provided with internal screwthreads 2 receiving a terminal nut 3 of a flexible air conduit 4.

A valve 44, which will be hereinafter described, is disposed within the passageway 26 for the purpose of controlling the flow of air therethrough. The passageway 26 joins a passageway 27 extending from the rear end of the handle portion into communication with the low pressure chamber through the head 7. It is thus provided that the normal line pressure is in constant communication with the low pressure cylinder in back of the follower piston 19.

As a means for supplying the air to the high pressure air cylinder at the forward end of the gun, the following arrangement of passageways and conduit is provided: A passageway 39 extends upwardly and radially from the passageway 27 and enters the end of a passageway 39a extending toward the forward end of the gun. A tube or conduit 37 joins the forward end of this passageway 39 with a passageway 38 extending through the wall of the section 10a of the forward cylinder head 9 and into communication with the pneumatic chamber in back of the pneumatic piston 31.

The admission of the air to the high pressure end of the gun is arbitrary and intermittent, and for this reason a control or throttle valve 41 is provided for controlling the flow thereto. The valve 41 is slidably mounted in a removable valve carrier 40 attached by screws to the rear of the handle portion of the gun, and having a sleeve extension entering into the passageway 27, the passageway 39 continuing through a radial port 39b in the sleeve extension into the valve carrier bore.

The valve 41 is firmly slidably mounted in the carrier by the provision of a rearward elongated body portion 42 for the valve slidably mounted in the corresponding bore in the carrier. A pair of opposingly related conical valve surfaces 43—43 are provided for alternate engagement with corresponding surfaces formed within the bore of the sleeve extension, the shank of the valve between these valve surfaces being of a considerably lesser diameter than the inner bore of the sleeve extension.

The elongated rear portion of the valve extends through the rear end of the carrier and is engaged by the upper end of a pivoted trigger 50 having its lower end mounted on a pin 52 secured in the panel 1.

The trigger 50 at the point where it engages the end of the valve is provided with a boss 51, and the trigger is further provided with an overhanging circular end 54 housing the exposed end of the valve. The valve 51 is normally forced rearwardly by a coil spring 48 compressed between the forward end of the valve and a bushing 49 secured in the forward end of the passageway 27.

In this normal position, the passageway 39 is cut off, due to the fact that the forward valve surface is seated, and the compressed air in the rear of the pneumatic high pressure piston has been exhausted past the unseated rear valve surface and to the atmosphere through an exhaust port 40ª extending from the bore of the sleeve extension through the rear side of the carrier 40.

The details of the follower piston 19 are as follows: A disk 20 has leather cup washers 21 secured at each side thereof by means of washers 22 engaging the respective outer surfaces of the washers and the whole assembly drawn together by means of bolts 23.

The washers 22 have outwardly extending concentric flanges 22ª terminating the inner edges thereof, these flanges extending beyond the inner flanges of the leather washers and serving as bumpers for engaging the respective cylinder heads and preventing damage to the flanges of the cup washers. The outwardly flared extension of the plates suitably clear the inner flanges of the leather washers so as to allow the admission of air and grease to the respective washers so as to obtain the proper sealing effect against the central charging tube.

The pneumatically operated piston 31 is conical in shape and is attached to the tubular ejector plunger by shrinking the same onto the plunger, the plunger having an intermediate outwardly extending flange thereon for determining the exact position of the piston relative thereto during assembly. A leather cup washer 32 is secured to the rear face or air side of the piston by means of a conical metal disk 33 shrunk on the rearwardly extending hub of the piston.

The wall of the cylinder 9 between the grease chamber and the air cylinder is provided with leather gaskets 35 disposed at each side thereof and in engagement with the tubular plunger extending therethrough. These gaskets are of the spreader type, being held in place by means of washers 36 seated in the opposite sides of the wall and are spread for their sealing function by the compacted grease on the one side and the compressed air on the other side.

The piston is urged rearwardly by means of a conical coil spring 34 compressed between an annular rim on the front face of the piston and the wall of the section 10. The piston 31 is limited in its rearward movement by the engagement of the hub thereof with the forward washer 36, this hub being of a length to space the body of the piston sufficiently away from the wall of the section 10ª to allow the rapid admission of the compressed air behind the piston. The wall of the member 10 is provided with a vent 10ᵇ to prevent pocketing of the air in front of the piston.

The forward end of the tubular ejector plunger is provided with a floating check valve compelling unidirectional flow of the grease upon actuation of the plunger. The valve is in the nature of a ball 55 seated on a valve seat 56 formed by a decreased bore portion.

A pin 57 is diametrically disposed across the extreme forward end of the plunger to prevent the ball valve from being displaced from the plunger when unseated. The valve seats upon forward or ejecting movement of the plunger, and unseats upon rearward or loading movement of the plunger.

As shown, the high pressure chamber 58 formed within the element 14 is of slightly larger diameter than the outside diameter of the ejector plunger, this allowing the grease under extremely high pressure to spread a gasket 47, disposed in the wall of the member 10 around the forward end of the plunger, against the plunger, so as to prevent any leakage at this point. The gasket 47 is secured in place by means of the element 14 screwed thereagainst.

The element 14 also contains a check valve 59 seating on a shoulder or valve seat 60 formed within the bore of the element 14 as the forward wall of the high pressure chamber and urged against said seat by a spring 61 under compression between a pin 62 and the ball valve 59. A terminal element 15 of a flexible grease conduit 16 is screwed into the outer end of the high pressure chamber element 14, and the conduit 16 has a coupling element 17 on its free end.

The valve 44 in the air intake passageway is rotative within a sleeve secured transverse to the passageway, and provides a large orifice 45 extending diametrically through the body of the valve and adapted to be aligned with the passageway 26, and a small orifice 46 at right angles to the first orifice. These orifices or passageways 45, 46, are used alternately for increasing or decreasing the area of the intake.

The purpose of this valve is to enable the user to adapt the gun to various type fittings. Some fittings require a sudden shot of grease, and others a high pressure pushing of the grease in the fitting. Restriction of the passageway causes the pushing effect to take place since it cuts down the velocity of the air through the passageway 26, and therefore the speed with which the pneumatically operated piston moves.

As detailed in Figure 6, the valve is provided with a handle, and being tapered is held within the conical bore of its bushing by means of a spring 44ª compressed between a washer engaged against a cotter pin on the end of a studded extension of the body and a washer engaged against the adjacent end of the bushing. A pin 44^b is radially secured in the body of the valve and moves within a quarter cut groove 44^c in the opposite end of the bushing for limiting the rotation of the valve to a quarter turn.

The gun reservoir is loaded or charged by the following device: A valve member 64 is screwed into the outer end of the radial passageway 63. The member 64 is tubular and is of reduced diameter at its inner or valve end, the extreme tip thereof being conical, providing a valve head 65 for engagement with a tapered shoulder 66 formed within the passageway 63. Radial ports 67 connect the interior of the member 64 with the bore of the passageway surrounding the valve end thereof.

As shown in Figures 4 and 5, a hand operated grease bucket 71 is provided with a nipple 72 in the discharge line thereof. The outer end of the member 64 carries a winged coupling sleeve 68. This winged coupling sleeve is provided with internal screwthreads at each end thereof and an intermediate internal shoulder 69. When it is desired to couple the gun to the loading pump, the wing nut is screwed onto the nipple, and the element 64 is unscrewed from its valve seat in the passageway 63.

A leather sleeve gasket 70 is seated within the enlarged bore of the element 64 toward the outer end thereof and adapted to sealingly engage about the end of the nipple 72 when the element 64 is unscrewed from the valve seat.

When the grease pump is operated, the grease is forced through the hollow element 64 through the cylinder head 7, into the tube 18, out of the sleeve into the reservoir, forcing the follower piston back to the rear end of the reservoir, until the reservoir is completely filled. Thereupon, the winged sleeve is unscrewed from the nipple and the element 64 is screwed into the passageway, and the valve is seated, closing off the charging passageway.

A relief cock 75 is provided in the lubricant line, the cock being screwed into the hollow sleeve 14 on the opposite side of the valve 59 from the high pressure chamber. This cock is opened to relieve the pressure in the grease line when it is difficult to disconnect the coupling element 17 due to the grease packed in the line preventing depression of the coupling member relative to a fitting to release the conventional bayonet slot connection.

Having described the detail and parts of the structure and arrangement to the extent necessary to provide a working example, it will be observed that I have provided a pneumatically operated heavy-duty lubricator admirably adapted for the purpose intended.

In general, however, and apart from minor detail, the lubricator comprises a grease reservoir cylinder, a central charging cylinder upon which is movably mounted a pneumatically operated piston follower for compacting the grease toward the discharge end, a concentric air cylinder separated by a wall from the grease reservoir, and a concentric discharge cylinder of reduced diameter at the end of the lubricator separated from the air cylinder.

To discharge the grease I have provided a combined ejector and conduit or hollow piston extending from the discharge chamber through the air cylinder and extending telescopically into the charging cylinder of the grease reservoir, which ejector conduit piston has a large area member or piston head in the air cylinder and a small area member or end portion of a diameter dimension to coact with the outlet. The check valve 55 may be regarded simply as a floating valve under a pressure less than the pneumatic pressure acting upon the follower piston, the latter constantly compacting grease in the reservoir and in the discharge chamber where it is acted upon by the ejector piston.

The check valve 59 in the outlet is held under pressure exceeding the pneumatic pressure on the follower piston so as to prevent leakage. In this manner, which could be varied in a great many ways, the outlet is controlled and the flow of the grease is rendered unidirectional.

It is to be observed that substantially the entire cubic capacity of the reservoir and the discharge or high pressure chamber is filled with grease compacted under the air line pressure. It will also be observed that the air cylinder which lies between the reservoir cylinder and the discharge or high pressure cylinder is of virtually the same diameter as the reservoir, from which it follows that in the operation of the lubricator the air acts upon a very large area of the discharge piston, and a very small area or plunger end of the discharge piston acts upon the grease in the discharge cylinder, thereby building up an immense servicing pressure for injecting grease into the bearings.

Also air, under air line pressure, say two hundred pounds, is constantly admitted into the rear end of the reservoir cylinder to act upon the follower and, through a valve or trigger-controlled outlet and bypass, the air under two hundred pounds pressure is delivered into the air cylinder to move the ejector piston rod forward, permitting it to be spring-returned.

As the plunger or ejecting end of this hollow piston is of a diameter just large enough to coact with the outlet orifice, it follows that the assumed two hundred pound air line pressure is developed into approximately eight thousand pounds pressure on the compacted mass of grease in the small diameter discharge cylinder at the end of the gun.

In operation, and the follower piston being at the rear end of the reservoir cylinder, grease is admitted through the valve 64 into the charging cylinder 18, flowing out through the same and filling the reservoir cylinder in front of the follower. When air is admitted in rear of the follower piston the grease is forced through the hollow piston, unseating the check valve and flowing into and being compacted in the discharge chamber. This is a constantly compacting force exerted on the entire mass of the grease from reservoir to discharge outlet. When the trigger is operated the ejector piston moves forward, the floating valve 55 being seated so that the front end of the piston is plugged, forcing the grease in the outlet and overcoming the tension of the check valve controlling outlet. Each time a charge of grease is shot out through the outlet the spring air cylinder moves the ejector piston rearwardly telescopically into the reservoir so that at each forward stroke of the piston it shoots a charge of grease and on each rearward stroke of the piston it receives a corresponding charge of grease compacted under the line pressure.

It is further charactertistic of this device, as regards its preferred embodiment, that there is constant communication between the discharge cylinder and the reservoir cylinder, and hence a constant compacting force exerted on the mass of grease when the lubricator is in service.

Having described my invention, I claim:

1. A heavy-duty lubricator, comprising, a low pressure reservoir cylinder and a co-axial high pressure cylinder and outlet, a dividing wall, an air-actuated follower piston in the reservoir cylinder, an air-actuated ejector and grease conduit piston in the discharge cylinder projecting through said wall, means establishing a constant air pressure supply to the reservoir piston and an intermitting air pressure supply to the high pressure discharge piston, and means controlling the outlet and rendering the grease flow unidirectional.

2. A heavy-duty lubricator, comprising, a low pressure reservoir cylinder, and a co-axial high pressure cylinder and outlet, a dividing wall, an air-actuated follower piston in the reservoir cylinder, an air-actuated grease conduit and ejector piston is the discharge cylinder projecting through said wall, means establishing a constant air pressure supply to the reservoir piston and an intermitting air pressure supply to the high pressure discharge piston, the effective pressure areas of the two pistons being relatively of the same dimensions, the ejecting end of the high pressure piston being approximately of the diameter of the outlet, and means controlling the outlet and rendering the grease flow unidirectional.

3. A heavy-duty lubricator, comprising, a low pressure reservoir cylinder, a concentric charging tube within the reservoir and communicating therewith, means for introducing grease into said charging tube, a high pressure discharge cylinder co-axially disposed relative to said low pressure reservoir cylinder and formed with a high pressure check valve controlled outlet, the charging tube and discharging cylinder being approximately of the same diameter, a wall dividing the high and low pressure ends of the gun, an air-actuated follower piston in the reservoir movably supported on the charging tube, a hollow high pressure piston in the high pressure cylinder, passing through the dividing wall, telescopically related to the charging tube and formed with a low pressure check valve, said hollow piston constituting an ejector and grease conduit, between the low and high pressure cylinders, the high pressure piston being formed with the piston head providing an effective pressure area substantially equal to the area of the follower piston in the reservoir, and means for constantly supplying air to actuate the following piston and intermittingly supplying air to actuate the high pressure piston.

4. A heavy-duty lubricator, comprising, a low pressure reservoir cylinder, an air-actuated follower piston therein, a co-axial air pressure cylinder separated from the reservoir, and a co-axial high pressure grease discharge cylinder and outlet separated from the air cylinder, an ejector and grease conduit piston having a large area member in the air cylinder and a small area member in the discharge cylinder coacting with the outlet, said piston extending from the discharge cylinder through the air cylinder into the reservoir, means for pneumatically actuating said pistons, and means for controlling said outlet and for rendering the grease flow unidirectional.

5. A heavy-duty lubricator, comprising, a body divided into three co-axial and separated chambers, a reservoir cylinder, an air cylinder and a grease discharge cylinder, an ejector conduit piston extending from the grease discharge cylinder through the air cylinder and projecting into the reservoir cylinder, said ejector piston having a large area member to be acted upon by the air in the cylinder and a small area member to act upon the grease in the discharge cylinder, a follower in the reservoir, means for admitting air under constant pressure in the rear of the follower, and means for intermittingly admitting air under line pressure into the air cylinder to actuate the ejector piston.

6. A heavy-duty lubricator, comprising, a body divided into a co-axial reservoir cylinder, an air cylinder and a reduced diameter discharge cylinder, a charging tube centrally located in the reservoir cylinder, a follower movably mounted on the charging tube in the reservoir, means for admitting air under line pressure in rear of said follower, means for introducing grease into said charging tube, an ejector conduit piston extending from the discharge cylinder through the air cylinder and telescopically entering the charging tube of the reservoir, said ejector piston having a large area member to be acted upon by the air in the air cylinder, and a small area member to act upon the grease in the discharge cylinder, means for introducing the air from the line into and exhausting it from the air cylinder to cause a forward stroke of the ejector piston, means for returning the piston, a valve controlled means for the cylinder outlet, and a floating valve device for the conduit portion of the ejector piston.

7. A heavy-duty lubricator combining in axial alignment and respectively longitudinally separated from one another, an air actuated member and grease compacting cylinder, an air cylinder, and a superpressure grease discharge chamber, a hollow ejector piston telescoping into the reservoir, extending through the air chamber and coacting with the outlet in the discharge chamber, establishing a grease conduit from reservoir to outlet constantly under the air pressure acting upon the grease in the reservoir, said piston being formed with a large area member in the air chamber and a small area member in the discharge chamber, and means for supplying air from the service line constantly to the reservoir and intermittingly to the air cylinder.

8. A lubricator of the class described, comprising, a cylinder adapted to hold lubricant, a tube concentrically disposed in said cylinder, a follower piston disposed in said cylinder slidable upon said tube to pack the lubricant to one end of the cylinder, said cylinder having a compressed air intake opening at one end, an inlet passageway for the lubricant connected to said tube so that lubricant may be forced through said tube into the reservoir, ejector mechanism disposed adjacent the forward end of said tube, said ejector mechanism adapted to discharge grease from the reservoir under high pressure, said ejector mechanism including a tubular plunger, the rear end of which is adapted to enter said tube, and a pneumatically operated piston for operating said tubular plunger.

9. In a lubricator, a filling device therefor in combination with the grease inlet for the lubricator, comprising, a combined valve and coupling element screwed into said inlet passageway, a valve seat in said passageway with which the inner end of said element coacts, the outer end of said member being provided with screw threads and packing for engaging the nipple of a reservoir, said valve and coupling element in one direction of rotation being unseated from the valve seat and secured to the nipple.

10. The combination with a lubricator body containing a pressure chamber, and an air supply passageway into said chamber, of a rotatable valve in said passageway having therein a plurality of diametrically disposed passageways of varying diameter for arbitrary alignment with the passageway for controlling the velocity of the compressed air passing through the passageway to the pressure chamber.

11. The combination with a lubricator body containing a pressure chamber, and an air supply passageway into said chamber, of a valve in said passageway having therein a plurality of passageways of varying area for arbitrary registration with the passageway for controlling the velocity of the compressed air passing through the passageway to the pressure chamber.

12. In a lubricator, a barrel, a follower piston movable within the barrel, providing a supply chamber at one side of the piston and a pressure chamber at the opposite side of the piston for applying a pressure against the supply of lubricant, a power cylinder fixed to one end of said barrel, an intermediate division wall providing a closure head for said barrel and power cylinder, a power piston movable in said power cylinder, a nozzle at the forward end of said power cylinder providing a plunger chamber from which the lubricant is forcibly discharged, a hollow plunger actuated by said power piston, one end of the plunger engaging into said plunger chamber and the opposite end of the plunger slidably extending through said intermediate wall and into said supply chamber of the barrel and providing a passage for communication between said supply chamber and plunger chamber and a check valve for said plunger passage closing with the power stroke of the plunger and cooperating therewith for forcing the lubricant from said plunger chamber and normally opened under the pressure of said supply lubricant for recharging said plunger chamber and relief for the power piston in its retreat stroke.

13. In a lubricator, a cylinder, a piston movable in said cylinder, a nozzle providing a plunger chamber from which lubricant is forcibly discharged, a hollow plunger actuated by said power piston, one end of the plunger engaging into said plunger chamber, the opposite end slidably engaged through a head wall of said cylinder and into the source of lubricant supply and providing a passage for communication with said plunger chamber and a supply of lubricant, and a check valve for said plunger passage closing with the power stroke of the plunger and cooperating therewith for forcing the lubricant from said plunger chamber, normally open for replenishing said plunger chamber and in a retreat stroke, for recharging said plunger chamber with lubricant.

14. In a lubricator, a cylinder, a head fixed to one end of the cylinder providing a hand hold for the lubricator and a support for the pressure control devices of the lubricator, a follower piston movable in said cylinder under air pressure admitted through a valve controlled passage in said head leading into a chamber formed in the cylinder by said piston and head, a hollow head fixed to the opposite end of said cylinder providing a nozzle for the lubricator and forcer plunger chamber, a tubular plunger reciprocable in said hollow head having its opposite ends respectively engaged into said forcer plunger chamber and lubricant supply chamber within the cylinder formed by a wall of said hollow head and the forward side of said follower piston for communication between said plunger and lubricant supply chambers, a forcer piston fixed to said tubular plunger and movable within a piston chamber in the hollow head, a check valve for said plunger closing its passage therethrough in a power stroke of the plunger and cooperating therewith for forcing the lubricant from said forcer plunger chamber, the valve opening in a retreat stroke of the plunger and under the pressure of the lubricant behind said valve and in said supply chamber for recharging the forcer plunger chamber.

In witness whereof I hereunto subscribe my name.

CLYDE G. BUTLER.